United States Patent [19]

Rodittis

[11] Patent Number: 4,632,303

[45] Date of Patent: Dec. 30, 1986

[54] ELECTRONIC THERMOSTAT WITH SWITCHED POWER CONVERTER

[76] Inventor: John N. Rodittis, 315 Zoda La., Vista, Calif. 92083

[21] Appl. No.: 791,299

[22] Filed: Oct. 25, 1985

[51] Int. Cl.[4] .............................................. F23N 5/20
[52] U.S. Cl. ..................................... 236/10; 236/46 R
[58] Field of Search ................. 165/12, 26; 236/46 R, 236/47, 10, 78 R

[56] References Cited

U.S. PATENT DOCUMENTS

| | | | |
|---|---|---|---|
| 3,891,144 | 6/1975 | Sadler et al. | 236/46 R |
| 3,974,426 | 8/1976 | Gingras | 236/47 |
| 4,079,366 | 3/1978 | Wong | 340/309.4 |
| 4,162,036 | 7/1979 | Balduzzi et al. | 236/46 R |
| 4,197,992 | 4/1980 | Klebanoff | 236/46 R |
| 4,206,872 | 6/1980 | Levine | 236/46 R |
| 4,235,368 | 11/1980 | Neel | 236/46 R |
| 4,267,966 | 5/1981 | Neel et al. | 236/46 A |

*Primary Examiner*—William E. Wayner
*Attorney, Agent, or Firm*—Brown, Martin, Haller & Meador

[57] ABSTRACT

An electronic thermostat utilizing a switched power supply which operates either from a voltage appearing across an open circuit at a heater or air conditioner activation circuit (de-energized state) or from a current flowing in the activation circuit upon short circuiting (energized state) of the activation circuit. The power supply provides an uninterrupted source of power to the electronic thermostat which controls the source of input power to the power supply in addition to the state of the activation circuit. The electronic circuit implements a piecewise linear, with hysteresis loop discontinuity, control function.

11 Claims, 2 Drawing Figures

ELECTRONIC THERMOSTAT WITH SWITCHED POWER CONVERTER

BACKGROUND OF THE INVENTION

I. Technical Field

The present invention relates to electronic thermostats. More specifically, the present invention relates to a novel electronic thermostat with a switched power converter for providing continuous power to the thermostat from a gas heater's activation circuit.

II. Background Art

The common gas household heating furnace is typically controlled by a room thermostat located remotely from the furnace. The thermostat, generally located in the room where the temperature is to be controlled, in conjunction with the heater activation circuit, integrated within the furnace, control the burning of gas within the furnace. The heater activation circuit, in response to the state of the thermostat, controls the gas flow into the furnace through a solenoid controlled gas valve.

Power for the heater activation circuit is typically provided through a step-down transformer that receives the nominal 120 volt, 60 Hz AC power at the step-down transformer primary winding. The step-down transformer provides at a secondary winding an output to the heater activation circuit of 24 volt, 60 Hz AC power. Typically the thermostat and the coil of the gas valve solenoid are series connected with the secondary of the step-down transformer.

The thermostat is typically a bistate control element which permits manual or automatic control of room temperatures. When the thermostat is in one state, i.e. room temperature has met or exceeded the predetermined temperature setting of the thermostat, the gas valve solenoid is deenergized under the control of the thermostat. As a result, the flow of gas which burns within the furnace is cut off and heating is inhibited.

When the room temperature drops below the predetermined temperature setting, the thermostat changes state. This change in states of the thermostat results in the energizing of the gas valve solenoid. In this energized condition the thermostat allows sufficient current to flow through the coil of the gas valve solenoid to fully energize the solenoid. Energizing the gas valve solenoid permits gas flow into the furnace for burning therein. Thermostats are typically constructed such that in this condition a short circuit is provided across the thermostat. As a result, full voltage of the step-down transformer secondary appears across the coil of the gas valve solenoid, resulting in energization of the solenoid. However, with a short circuit appearing at the thermostat, no voltage is available to the thermostat itself.

In applications where electronic circuitry is used within the thermostat for temperature sensing and heater activation circuit controlling, uninterrupted power must be provided to the electronic circuitry for continuous operation. One attempt at providing continuous power to the electronic thermostat has been the use of batteries within the thermostat. Such schemes have included either replaceable batteries or the incorporation of rechargeable batteries, individually, or in combination with a battery charger circuit integrated within the thermostat. In both cases, the batteries must be replaced at periodic intervals and the cost of the thermostat increases due to the increased circuit complexity and battery cost.

Other approaches at providing power to the thermostat from the heater activation circuit have been attempted. One such approach utilized voltage/current switching through silicon controlled rectifiers in series with heater activation circuit. This scheme resulted in highly distorted voltage and current waveforms in the heater activation circuit. These distorted waveforms may release electromagnetic radiation into the household environment, and throughout the electrical power network to other households. These distortions may endanger the lives of individuals using heart pacing devices in addition to producing radio and television interference. In addition to the distorted voltage and current waveforms the attempted approach does not provide for the control of the activation of the gas valve solenoid. This control is still utilizing the mechanical bimetal element of the mechanical thermostat.

It is therefore an object of the present invention to provide a novel and improved electronic thermostat incorporating a switched power converter which permits continuous power to be provided to the thermostat from a heater activation circuit.

It is yet another object of the present invention to provide an electronic thermostat with active switching of the heater activation circuit control currents.

It is a further object of the present invention to provide an electronic thermostat which utilizes power from a heater activation circuit resulting in the elimination of alternate power sources for continuous operation of the thermostat.

SUMMARY OF THE INVENTION

An electronic thermostat for controlling the energization of a heater activation circuit including bistate sensor means responsive to the environmental temperature for generating a corresponding environmental temperature signal, and for generating a predetermined reference signal for, while in a first state changing to a second state when said environmental temperature signal has a first predetermined relationship with said reference signal, and for, while in said second state changing to said first state when said environmental temperature signal has a second predetermined relationship with said reference signal. The sensor means provides a control signal when in said second state. Power supply means are included for receiving and controlling alternating current flow in a heater activation circuit while providing uninterrupted power to the sensor means with the power supply means including a first control means and a second control means. The first control means controls alternating current at a first predetermined level as a first control current and converts the first control current into a first unidirectional current provided at a first output coupled to the sensor means. The second control means for controls alternating current at a second predetermined level as a second control current and converts a portion of the second control current into a second unidirectional current for providing at a second output coupled to the sensor means. The second control current is greater than the first control current. The power supply means includes switch means responsive to the control signal for respectively coupling the first and second control currents to the first and second control means respectively during the first and second states. The heater activation circuit is deenergized during the first state and energized during the second state.

BRIEF DESCRIPTION OF THE DRAWINGS

These and other features, objects and advantages of the present invention will be more fully apparent from the detailed description set forth below taken in conjunction with the drawings in which like reference characters identify corresponding throughout and wherein.

DETAILED DESCRIPTION OF THE PREFERRED EMBODIMENT

Figure 1:
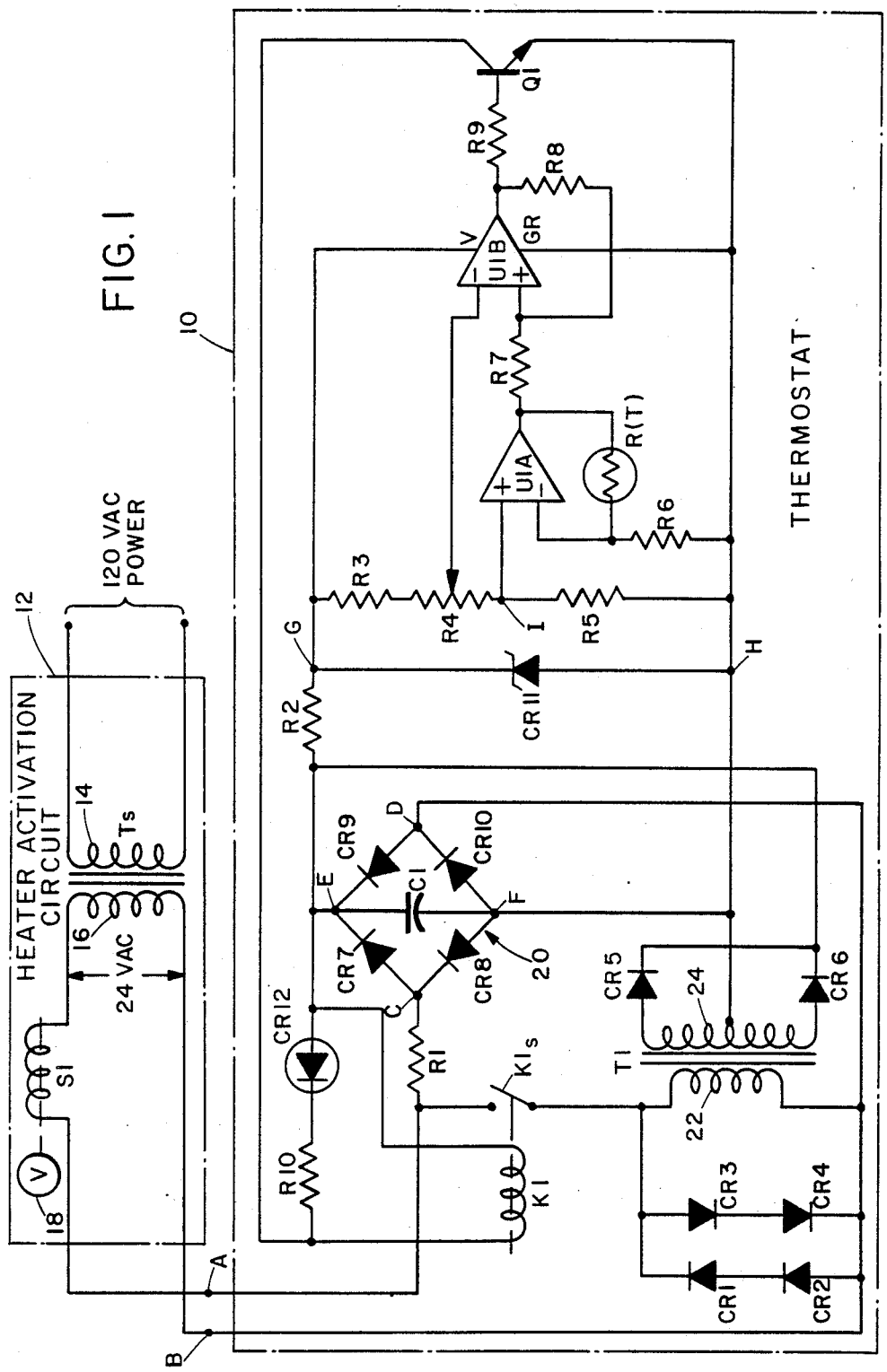
FIG. 1 is a schematic view of an electronic thermostat with switched power supply of the present invention.

The present invention comprises a novel electronic thermostat with switched power supply for providing continuous power from a heater activation circuit to the thermostat. Referring to FIG. 1, there is shown by schematic illustration an electronic thermostat 10 having a pair of inputs A and B connected in series to a heater activation circuit 12. Thermostat 10 is typically located in a room remote from the heater activation circuit and furnace, and in a room where the temperature is to be controlled. The heater activation circuit is typically installed within the furnace itself.

The heater activation circuit 12 is comprised of a step-down transformer Ts having a primary winding 14 for receiving 120 volt, 60 Hz AC power. Step-down transformer Ts has a secondary winding 16 which has one end coupled to point B and another end coupled through coil S1 of gas valve solenoid 18 to point A. In effect, secondary windings 16 and coils S1 are connected in series with thermostat 10. With the voltage appearing across secondary winding 16 when the thermostat is de-energized, current flows in the circuit which is insufficient current to energize gas valve solenoid 18. In this case there is a voltage appearing across the secondary winding 16 of 24 volts.

Within the thermostat, input A is coupled through resistor R1 to an input C of full wave rectifier or diode bridge 20. Bridge 20 is comprised of diodes CR7, CR8, CR9 and CR10. Similarly, input B is coupled to input D of diode bridge 20. Bridge 20 is connected with the anode of diode CR7 and the cathode of diode CR8 connected to input C while the anode of diode CR9 and the cathode of diode CR10 are connected to input D. Bridge 20 has a pair of outputs E and F with the cathodes of diodes CR7 and CR9 coupled to output E with the anodes of diodes CR8 and CR10 coupled to output F.

Output E of bridge 20 is coupled through resistor R2 to node G. Output F is coupled to node H as described later. Capacitor C1 is coupled across the outputs E and F of bridge 20.

Node G is coupled to the cathode of zener diode CR11 while output F of bridge 20 is coupled to the anode of zener diode CR11 at node H. A voltage divider string comprised of series connected resistors R3, R4 and R5 are coupled across nodes G and H. Resistors R3 and R5 are fixed resistors while resistor R4 is a variable resistor, such as a potentiometer.

The non-inverting input of amplifier U1A, typically of a LM 124 operational amplifier, is coupled to node I between resistors R4 and R5. The inverting input of amplifier U1A is coupled through resistor R6 to node H. The output of amplifier U1A is connected to the inverting input of amplifier U1A through a temperature sensitive device, such as thermistor R(T).

The output of amplifier U1A is also coupled through resistor R7 to the non-inverting input of amplifier U1B, typically part of the sample LM 124 operational amplifier chip. The non-inverting input of amplifier U1B is coupled through resistor R8 to the output of amplifier U1B. The inverting input of amplifier U1B is coupled to the adjustable tap potentiometer R4. Power is supplied to the operational amplifier by connecting node G to the V input of the operational amplifier, as illustrated only on U1B for the dual amplifier chip. Similarly, the ground connection GR is illustrated as being coupled to node H. The output of amplifier U1B is coupled through resistor R9 to the base of an NPN transistor Q1. The emitter of transistor Q1 is connected to node H while the collector of transistor Q1 is coupled through resistor R10 to the cathode of light emitting diode CR12. The anode of light emitting diode CR12 is coupled to a point common to input E of bridge 20. The collector of transistor Q1 is also coupled through the coil of relay K1 to a point also common to input E of brdge 20.

Input A is coupled upon the energization of relay K1 through the relay contact K1s to one end of the primary winding 22 of transformer T1. The other ending of primary winding 22 is coupled to input B. Parallel connected across primary winding 22 are a pair of diode pairs.

The first diode pair is comprised of diodes CR1 and CR2. Diode CR2 is connected with its anode connected to the end of primary winding 22 common to input B. The cathode of diode CR2 is connected to the anode of diode CR1. The anode of diode CR1 is connected to the end of primary winding 22 common to input A upon the closing of the contact K1s.

The second pair of diodes is comprised of diodes CR3 and CR4. Diodes CR3 and CR4 are similarly coupled across primary winding 22 with the reverse orientation with respect to diodes CR1 and CR2. Diode CR4 is connected with its cathode connected to one end of primary winding 22 common to input B. The anode of diode CR4 is connected to the cathode of diode CR3. The anode of CR3 is coupled to the end of primary winding 22 common to input A upon the closing of contact K1. Transformer T1 has a secondary winding 24 which includes a centertap coupled to node H which is common to output F of bridge 20. A pair of diodes CR5 and CR6 are connected at their anodes at respective ends of secondary winding 24 with their cathodes sharing a common connection to output E of bridge 20 and coupled through resistor R2 to node G.

Table 1 set forth below indicates a component listing of components preferred in one embodiment of the invention.

TABLE 1

| COMPONENT | VALUE/MANUFACTURER PART NO. |
| --- | --- |
| C1 | 47 MF/16 V, 20% |
| CR1-CR4 | 1N4001 |
| CR5-CR10 | 1N914 |
| CR11 | 5.2 V ZENER |
| CR12 | LED |
| K1 | Reed Relay/5 V, 500 Ω 1.0 A Cont. |
| R1 | 2.0KΩ |
| R2 | 330 Ω |

TABLE 1-continued

| COMPONENT | VALUE/MANUFACTURER PART NO. |
|---|---|
| R3 | 5.1KΩ |
| R4 | 10KΩ linear tap |
| R5, R7 | 5.1KΩ |
| R6, R9 | 10KΩ |
| R8 | 750KΩ |
| R10 | 1KΩ |
| R(T) | 10KΩ Thermistor |
| T1 | T-100/JNR Engineering |
| U1 (A,B) | LM 124 |

In the operation of the thermostat, the temperature setting is established by operator control of the tap on resistor R4. The temperature set by the operator appears as a voltage at the inverting input of amplifier U1B. Amplifier U1B is configured as voltage comparator whose output switches between ground and a predetermined voltage sufficient to provide drive current for transistor Q1. When the voltage in the inverting input is greater than the voltage appearing at the non-inverting input of amplifier U1B Q1 is biased off. While Q1 biased off relay K1 is de-energized and the associated contact K1s is open. Under these conditions, power is provided to the thermostat through step-down transformer Ts to a first power supply comprised of resistor R1 and bridge 20.

Resistor R1 value is selected to be substantially greater than the impedance of gas valve solenoid coil. It is of the order of 30 times greater than that of the coil. Resistor R1 is selected in value to limit the current drawn by the first power supply and establish the output voltage. In this mode, the current drawn by the thermostat is significant to activate or affect the operation of the gas valve solenoid S1. Bridge 20 full wave rectifies the alternating current provided by the heater activation circuit. The rectified power output from bridge 20 is filtered by capacitor C1 which is coupled across the output of bridge 20. The voltage appearing across capacitor C1 is fed through resistor R2 to node G where it is regulated by zener diode CR11. Therefore, continuous power is provided in this mode of operation to the thermostat temperature sensing electronics, i.e. resistors R3-R9, thermistor R(T), amplifiers U1A and U1B and transistor Q1.

When the temperature as sensed by thermistor R(T) is lower than the preset temperature, transistor Q1 is biased on. As a result, relay K1 is energized closing contact K1s. Alternating current from the heater activation circuit is then shunted by contact K1s through the second power supply comprised of transformer T1, and diodes CR1-CR6. The current is shunted through primary winding 22 of transformer T1, and the diode combination CR1-CR4. The combination of diodes CR1-CR4 and the primary winding 22 of transformer T1 provide an extremely low impedance path for the current flowing in the heater activation circuit. Primary winding 22 and diodes CR1-CR4 have an impedance level about 0.065, maximum, of the impedance of the solenoid coil S1. Diode CR1-CR4 limit the maximum voltage inductively coupled to the secondary winding 24 of transformer T1. As a result, the current through the solenoid coil is not affected by the insertion of the transformer/diode combination. The current flowing in the heater activation circuit which energizes the solenoid coil S1 has a waveform which is substantially unaffected by the insertion of the transformer/diode combination.

Transformer T1 is selected such that the primary winding has N1 number of terms with the secondary windings having N2 turns (N2 being the number of turns between the centertap and an end of the secondary winding) and the N2/N1 ratio is sufficiently high so that the voltage at the secondary matches the output voltage provided by the first power supply. In the preferred embodiment of the invention the N2/N1 ratio is preferebly about 8.

Diodes CR5 and CR6 are coupled at opposite ends of secondary winding 24 and provide full wave rectification of the output of transformer T1. The centertap of secondary winding is coupled to node H with the cathodes of diodes CR5 sharing a common connection to resistor R2 as did bridge 20 output E. Capacitor C1 also filters the full wave rectified voltage wave form as it did for the first power supply. With power being provided from the heater activation circuit through transformer T1 zener diode CR11 continues to regulate the voltage applied to the following temperature signal processing circuitry.

When the heater activation circuit is energized transistor Q1 is conducting and sinks current provided by the transformer T1 power supply through light emitting diode CR12 and current limiting resistor R10. Light emitting diode CR12 may be used as an indicator to the operator that the heater activation circuit has been energized. Using this indication the operator may set the temperature setting of thermostat relative to the room temperature.

It should be noted that the transition of power from the first power supply to the second power supply is essentially transient free and eliminates interruption of the temperature signal processing circuitry power through the shunting of current through the control of transistor Q1 and relay K1.

In the preferred embodiment of the invention, the temperature transducer utilized in the thermostat is a thermistor R(T). It is apparent to one skilled in the art that other types of temperature transducers may be utilized in place of a thermistor. In applications of household heating, the range of interest is typically 50°-90° F. Within this range the thermistor's transfer function can be approximated by linear function of the form:

$$R(T) = a + bT \quad (1)$$

where b is the slope at the middle of the range taken at about the temperature 70° F., a is a constant dependent upon the value of the thermistor, and T is temperature.

Figure 2:
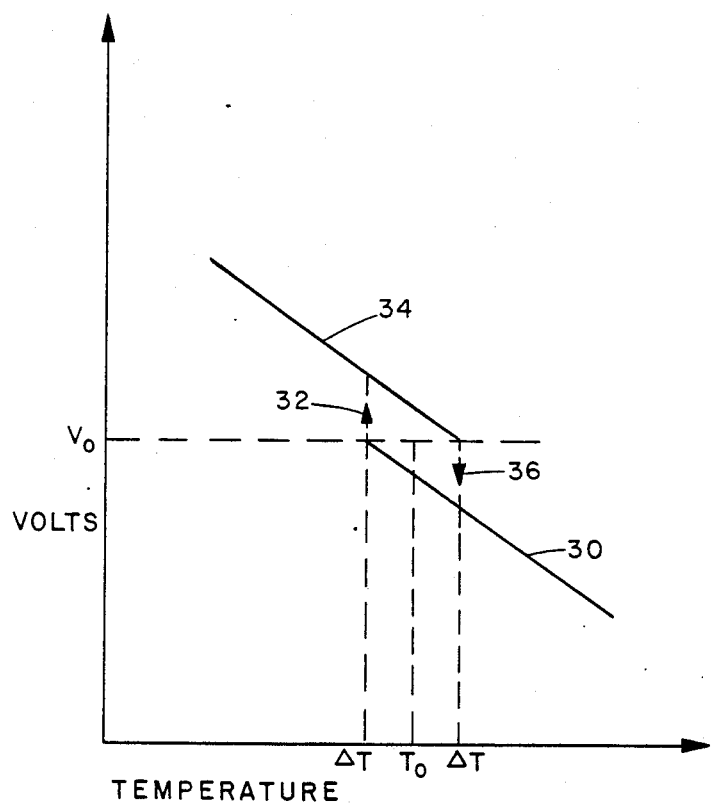
FIG. 2 is a graphical representation of the piecewise linear, hysteresis loop discontinuity control function of the electronic circuit of the thermostat.

Utilizing the linear function of the thermistor, amplifier U1A and potentiometer are also implemented as linear elements. With potentiometer R4 being linear, simplification of the operator controls are available for controlling the thermostat set temperature. With the temperature settings being linear, the thermostat is more readily adaptable for computer, microprocessor control or other automatic process control without the need for linearizing or correction circuitry. In the temperature signal processing circuitry, resistors R7 and R8 provide hysteresis which is desirable in optimizing the operation of the heater thermostat system in relation to the user's comfort and efficient operation. The efficient operation of the system is dependent upon the heaters cycle length and frequency. It is preferred that the hysteresis be set by the selection of resistors R7 and R8 such that the hysteresis is approximately ±0.75° F. With amplifier U1B implemented as a voltage comparator, its output voltage switches between ground and a positive voltage level close to the supply voltage V depending upon the relative polarity between the inverting and non-inverting inputs. FIG. 2 illustrates the hysteresis desired for the thermostat of the present invention. In FIG. 2 the voltage $V_o$ represents the value which appears at the non-inverting input of amplifier U1B. The voltage appearing at the inventing input of amplifier U1B corresponds to the user set temperature $T_o$. When the temperature of the room is higher than the set temperature $T_o$, the voltage at the non-inverting input of amplifier U1B is lower than at the inverting input. As a result the output of amplifier U1B is low (ground) so that the thermostat controls the heater activation circuit gas valve solenoid is de-energized.

As the room temperature drops, the voltage appearing at the non-inverting input rises. This corresponds to the following of curve 30 in FIG. 2. When the room temperature drops sufficiently such that the voltage appearing at the non-inverting input of amplifier U1B equals and slightly surpasses that of the inverting input, the output of the amplifier U1B goes to its positive voltage level which results in the voltage and the non-inverting input of amplifier U1B jumping instantly from the point of intersection of the $V_o$ and curve 30, along dashed lines 32 to a point along curve 34. The instantaneous voltage jump of a positive $\Delta V$ provides the hysteresis function which has a magnitude dependent upon the values of resistors R7 and R8 in addition to the value of the positive voltage level at the output of amplifier U1B.

Similarly, this process is repeated with a negative $\Delta V$ voltage jump occurring when the temperature of the room rises sufficiently to the level where the voltage at the non-inverting input of amplifier U1B equals or drops below $V_o$. At this point the voltage jumps the $-\Delta V$ increment along dashed lines 36 to curve 30.

The user may therefore by setting the temperature at the thermostat to a specific temperature whereby the thermostat will automatically regulate a room temperature of $T_o \pm \Delta T$ illustrated in FIG. 2. It should be noted that the $\Delta T$ increment is constant and independent of the set temperature $T_o$. Therefore, as the set temperature is changed the hysteresis about the set temperature will remain constant.

The previous description of the preferred embodiment are provided to enable any person skilled in the art to make or use the present invention. Various modifications to these embodiments will be readily apparent to those skilled in the art, and the generic principals defined herein may be applied to other embodiments without the use of the inventive faculty. Thus, the present invention is not intended to be limited to the embodiments shown herein, but is to be accorded the widest scope consistent with the principals and novel features disclosed herein.

What is claimed is:

1. An electronic thermostat for controlling the energization of a heater activation circuit comprising:
    bistate sensor means responsive to the environmental temperature for generating a corresponding environmental temperature signal, and for generating a predetermined reference signal in response to an operator's input and for, while in a first state changing to a second state when said environmental temperature signal has a predetermined relationship with said reference signal, and for, while in said second state changing to said first state when said environmental temperature signal has said predetermined relationship with said reference signal, said sensor means providing a control signal when in said second state;
    power supply means for receiving and controlling the flow of alternating current in a heater activation circuit and for providing uninterrupted power at a predetermined voltage level to said sensor means, said power supply means including:
    a. first control means for receiving said alternating current, for controlling said alternating current at a first predetermined level as a first control current and for converting said first control current into a first unidirectional current provided at a first output to said sensor means, said first control means comprising a full wave rectifier having a pair of rectifier inputs and a pair of rectifier outputs, said rectifier inputs connecting said rectifier in series with a heater activation circuit and said rectifier outputs connected to said sensor means, and a current limiting resistor connected in series between one of said rectifier inputs and a heater activation circuit;
    b. second control means for controlling said alternating current at a second predetermined level as a second control current and for converting a portion of said second control current into a second unidirectional current provided at a second output coupled to said sensor means, said second control current being greater than said first control current;
    c. switch means coupled to said first and second control means and responsive to said control signal for respectively coupling said first and second control currents to said first and second control means respectively during said first and second states; and
    wherein a heater activation circuit is de-energized during said first state and energized during said second state.

2. The thermostat of claim 1 wherein said second control means comprises:
    a transformer having primary and secondary windings, said primary winding being coupled in series with a heater activation circuit by said switch means so as to receive said alternating current;
    voltage limiter means coupled across said primary winding for limiting the voltage appearing across said primary winding and the corresponding voltage developed across said secondary winding; and
    rectifier means coupled across said secondary winding for providing said second unidirectional current.

3. The thermostat of claim 2 wherein said bistate sensor means generates first and second linear environmental temperature signals when respectively in said first and second states, said first and second temperatures signals having substantially identical linear responses to variations in temperature while offset by a predetermined constant.

4. An electronic thermostat for controlling the energization of a heater activation circuit comprising:
    bistate sensor means responsive to the environmental temperature for generating a corresponding environmental temperature signal, and for generating a predetermined reference signal in response to an operator's input and for, while in a first state changing to a second state when said environmental temperature signal has a predetermined relationship with said reference signal, and for, while in said second state changing to said first state when said environmental temperature signal has said predetermined relationship with said reference signal, said sensor means providing a control signal when in said second state;

power supply means for receiving and controlling the flow of alternating current in a heater activation circuit and for providing uninterrupted power at a predetermined voltage level to said sensor means, said power supply means including:

a. first control means for receiving said alternating current, for controlling said alternating current at a first predetermined level as a first control current and for converting said first control current into a first unidirectional current provided at a first output to said sensor means, said first control means comprising a full wave rectifier having a pair of rectifier inputs and a pair of rectifier outputs, said rectifier inputs connecting said rectifier in series with a heater activation circuit and said rectifier outputs connected to said sensor means, and a current limiting resistor connected in series between one of said rectifier inputs and a heater activation circuit;

b. second control means for controlling said alternating current at a second predetermined level as a second control current and for converting a portion of said second control current into a second unidirectional current provided at a second output coupled to said sensor means, said second control current being greater than said first control current;

c. switch means coupled to said first and second control means and responsive to said control signal for respectively coupling said first and second control currents to said first and second control means respectively during said first and second states;

filter means coupled to said first and second outputs for filtering the voltage and current waveforms of said first and second unidirectional currents wherein said filter means stores sufficient energy so as to support uninterrupted operation of said sensor means during the transition between said first and second control means; and regulating means coupled to said filter means and said bistate sensor means for regulating the voltage associated with said first and second unidirectional currents to a predetermined level, and wherein a heater activation circuit is de-energized during said first state and energized during said second state.

5. The thermostat of claim 4 wherein said second control means comprises:

a transformer having primary and secondary windings, said primary winding being coupled in series with a heater activation circuit by said switch means so as to receive said alternating current;

voltage limiter means coupled across said primary winding for limiting the voltage appearing across said primary winding and the corresponding voltage developed across said secondary winding; and rectifier means coupled across said secondary winding for providing said second unidirectional current.

6. The thermostat of claim 5 wherein said filter means comprises a capacitor coupled to said first and second outputs and said regulating means comprises a zener diode coupled to said capacitor and said sensor means.

7. The thermostat of claim 6 further comprising a resistor coupled between said capacitor and said zener diode.

8. The thermostat of claim 5 wherein said bistate sensor means generates first and second linear environmental temperature signals when respectively in said first and second states, said first and second temperatures signals having substantially identical linear responses to variations in temperature while offset by a predetermined constant.

9. An electronic thermostat for controlling the energization of a heater activation circuit comprising:

bistate sensor means responsive to the environmental temperature for generating a corresponding environmental temperature signal, and for generating a predetermined reference signal in response to an operator's input and for, while in a first state changing to a second state when said environmental temperature signal has a predetermined relationship with said reference signal, and for, while in said second state changing to said first state when said environmental temperature signal has said predetermined relationship with said reference signal, said sensor means providing a control signal when in said second state;

power supply means for receiving and controlling the flow of alternating current in a heater activation circuit and for providing uninterrupted power at a predetermined voltage level to said sensor means, said power supply means including:

a. first control means for controlling said alternating current at a first predetermined level as a first control current and for converting said first control current into a first unidirectional current provided at a first output to said sensor means;

b. second control means for controlling said alternating current at a second predetermined level as a second control current and for converting a portion of said second control current into a second unidirectional current provided at a second output coupled to said sensor means, said second control current being greater than said first control current;

c. switch means coupled to said first and second control means and responsive to said control signal for respectively coupling said first and second control currents to said first and second control means respectively during said first and second states;

filter means coupled to said first and second outputs for filtering the voltage and current waveforms of said first and second unidirectional currents wherein said filter means stores sufficient energy so as to support uninterrupted operation of said sensor means during the transition between said first and second control means, said filter means comprising a capacitor coupled to said first and second outputs;

regulating means coupled to said filter means and said bistate sensor means for regulating the voltage associated with said first and second unidirectional currents to a predetermined level, said regulating means comprising a zener diode coupled to said filter means capacitor and said sensor means; and wherein a heater activation circuit is de-energized during said first state and energized during said second state.

10. The thermostat of claim 9 further comprising a resistor coupled between said capacitor and said zener diode.

11. An electronic thermostat for controlling the energization of a heater activation circuit comprising:

bistate sensor means responsive to the environmental temperature for generating a corresponding environmental temperature signal, and for generating a predetermined reference signal in response to an operator's input and for, while in a first state changing to a second state when said environmental temperature signal has a predetermined relationship with said reference signal, and for, while in said second state changing to said first state when said environmental temperature signal has said predetermined relationship with said reference signal, said sensor means providing a control signal when in said second state;

power supply means for receiving and controlling the flow of alternating current in a heater activation circuit and for providing uninterrupted power at a predetermined voltage level to said sensor means, said power supply means including:

a. first control means for receiving said alternating current, for controlling said alternating current at a first predetermined level as a first control current and for converting said first control current into a first unidirectional current provided at a first output to said sensor means;

b. second control means for receiving said alternating current, for controlling said alternating current at a second predetermined level as a second control current and for converting a portion of said second control current into a second unidirectional current provided at a second output coupled to said sensor means, said second control current being greater than said first control current, said second control means comprising a transformer having primary and secondary windings, voltage limiter means coupled across said primary winding for limiting the voltage appearing across said primary winding and the corresponding voltage developed across said secondary winding and rectifier means coupled across said secondary winding for providing said second unidirectional current;

c. switch means coupled to said first and second control means and responsive to said control signal for respectively coupling said first and second control currents to said first and second control means respectively during said first and second states, said second control means transformer primary winding coupled in series with a heater activation circuit by said switch means during said second state; and wherein a heater activation circuit is de-energized during said first state and energized during said second state.

* * * * *